United States Patent [19]

Garnier et al.

[11] Patent Number: 4,970,600
[45] Date of Patent: Nov. 13, 1990

[54] LASER ENGRAVER WITH X-Y ASSEMBLY AND CUT CONTROL

[75] Inventors: Steven F. Garnier, Denver; John Doran, Littleton, both of Colo.

[73] Assignee: Melco Industries, Inc., Denver, Colo.

[21] Appl. No.: 333,121

[22] Filed: Apr. 4, 1989

[51] Int. Cl.[5] ............... H04N 1/032; B23K 26/08; G06F 15/46

[52] U.S. Cl. .................. 358/299; 364/474.08; 219/121.78; 219/121.68; 219/121.69

[58] Field of Search ............ 358/299; 219/121.67, 219/121.68, 121.78, 121.69; 364/474.08

[56] References Cited

U.S. PATENT DOCUMENTS 4,354,196 10/1982 Neumann et al. .
4,640,382 2/1987 Hartman .................. 219/121.78
4,725,709 2/1988 Mattelin ................... 219/121.78

FOREIGN PATENT DOCUMENTS 2415513 9/1979 France ..................... 219/121.68
93490 4/1988 Japan ...................... 219/121.78

OTHER PUBLICATIONS

Product Literature of Laser Machining, Inc. of Somerset, Wisconsin.
Product Literature of General Scanning of Watertown, Massachusetts.

*Primary Examiner*—George H. Miller, Jr.
*Assistant Examiner*—Scott A. Rogers
*Attorney, Agent, or Firm*—Sheridan, Ross & McIntosh

[57] ABSTRACT

The present invention provides a laser engraver for engraving a pattern on a workpiece. The pattern is established on the workpiece by using a X-Y assembly to move a laser beam in two dimensions relative to the workpiece. The X-Y assembly employs a X proportional-integral-differential (PID) controller and a Y PID to generate control signals for moving the X-Y assembly. The PIDs generate the control signal based upon the current positon of the laser beam and a target position for the laser beam. The current position is provided by encoders operatively attached to motors that, in turn, move mirrors that direct the laser beam to the workpiece. The depth of cut is, preferably, controlled by using the integral of the difference between the position of the laser beam as it is moved by the X-Y assembly and a reference position. Alternatively, proportional control based upon the absolute difference between the position of the laser as it is moved by the X-Y assembly and the reference position can be utilized.

35 Claims, 6 Drawing Sheets

LASER ENGRAVER WITH X-Y ASSEMBLY AND CUT CONTROL

FIELD OF THE INVENTION

The present invention relates to an apparatus and method for laser engraving.

BACKGROUND OF THE INVENTION

Presently, laser engravers employ two methods to move a laser beam relative to a workpiece in order to establish a pattern thereon. The first method is known as the raster scan method. In the raster scan method a laser beam having a defined width is horizontally swept across the workpiece. As the laser beam is horizontally swept across the workpiece it is also modulated to establish the pattern or a portion thereof on the workpiece. Following the completion of a horizontal sweep the laser beam is moved vertically relative to the workpiece by an incremental distance, typically the width of the laser beam, thereby positioning the laser beam for another horizontal sweep. The process of moving the laser beam horizontally and then vertically relative to the workpiece is repeated until the entire pattern is established on the workpiece. Exemplary of an apparatus that implements the raster scan method is U.S. Pat. No. 4,354,196, issued on Oct. 12, 1982, to Neumann et al., for a "Laser Engraving System with Massive Base Table and Synchronization Controls". In Neumann et al, a mirror is rotated at a constant angular velocity to horizontally sweep the laser beam. Vertical movement of the laser beam relative to the workpiece is accomplished by moving the carriage on which the workpiece is located.

The primary drawback associated with laser engravers that implement the raster scan method is that the time required to process a workpiece is a function of the area encompassed by the pattern and not the area of the pattern to be established on the workpiece. For example, suppose that the pattern to be engraved on a workpiece is an outline of a square having sides that are one foot in length and one inch wide. A raster scan laser engraver would have to move the laser beam over the entire one square foot of surface area encompassed by the outline of the square in order to establish the outline of the square on a workpiece. In contrast, the actual area engraved is approximately a third of a square foot. Consequently, laser engravers that implement the raster scan method are relatively inefficient in applications where the area encompassed by the pattern is relatively large in comparison to the area of the pattern itself.

The second method presently used to move a laser beam relative to a workpiece in order to establish a pattern thereon is characterized by the use of a high-performance galvanometer driven mirror assembly in combination with a diverging lens. The galvanometer driven mirror assembly typically includes a mirror suspended from a gimbal which permits the mirror to be rotated in any direction. One or more solenoids are used to rotate the mirror with respect to the gimbal. High performance is achieved in a galvanometer driven mirror assembly by restricting the degree to which the solenoids can rotate the mirror. However, restricting the degree to which the solenoids can rotate the mirror also restricts the area over which the beam can be moved for a given separation between the mirror and the workpiece. In order to expand the area over which the beam can be moved the aforementioned diverging lens is interposed between the mirror and the workpiece to expand or amplify the area over which the beam can be applied. A pattern is established on a workpiece by directing a laser beam to the mirror and rotating the mirror by an amount which takes into account the amplification caused by the diverging lens.

There are several drawbacks associated with laser engravers that employ a high-performance galvanometer driven mirror in conjunction with a diverging lens. Namely, such laser engravers are very sensitive to angular errors in the positioning of the mirror. In other words, a small angular error in the position of the mirror produces a relatively large error in the positioning of the laser beam on the workpiece due to, among other things, the amplification of the diverging lens. Concomitantly, the amplification of the diverging lens is dependent upon the distance between the mirror and the workpiece. Hence, such laser engravers are also sensitive to the distance separating the mirror and the workpiece. Further, the amplification provided by the diverging lens is directly related to its diameter which is, in turn, directly related to its expense. Consequently, applications that require a relatively large diverging lens in order to establish a pattern on a workpiece are prohibitively expensive.

Alternatively, a high performance, motor driven, single or multi-lens focus assembly can be combined with two galvanometer driven mirrors. In operation the galvanometer driver mirrors are rotated to position the laser beam on the workpiece. Such laser engravers are also expensive, and sensitive to relatively small errors in the angular position of the mirror and the distance between the mirror and the workpiece.

Another consideration with respect to laser engravers is the ability to control the depth of the cut made in the workpiece by the laser beam. The depth of the cut is directly related to the power of the laser beam and the speed with which the laser beam is being moved relative to the workpiece. For example, if the power of the laser beam is constant and the laser beam is being moved at a constant speed relative to the workpiece then a cut having a constant depth will be produced. The depth of the cut can be varied by varying the power of the laser beam and/or the speed with which the laser beam is being moved relative to the workpiece.

One method of producing a cut with a constant depth in laser engravers employing the raster scan method is to limit variations in the speed at which the laser beam is moved to points exterior to the workpiece and to maintain both the power of the laser beam and its rate of travel relative to the workpiece at constant levels while it is passing over the workpiece. More specifically, the laser beam is positioned a sufficient distance from the edge of the workpiece to allow acceleration of the laser beam to a constant velocity while it is still exterior to the workpiece. Consequently, once the laser beam engages the workpiece it is moving at a substantially constant velocity. By maintaining both the power of the laser beam and the speed of laser beam at constant levels a cut having a constant depth can be produced. Once the laser beam leaves the workpiece, its speed is reduced so that a return sweep can be made in the opposite direction. A drawback associated with maintaining a constant depth of cut in this fashion is the time, and hence the inefficiency, associated with accelerating and decelerating the laser beam when it is exterior to the workpiece. Another drawback associated with the aforementioned method is that it does not allow the depth of cut or cut profile to be varied. For instance, the aforementioned method cannot produce cuts having different constant depths. Further, the aforementioned method cannot produce a cut that is, for instance, initially shallow and becomes progressively deeper.

Another method for maintaining a constant depth of cut in laser engravers employing the raster scanning method is suggested by the apparatus for producing a uniform exposure of a medium on which an artwork master for a circuit board is to be established in the patent to Neumann, et al. In Neumann, the beam is swept across the workpiece by rotating a mirror at a constant angular velocity. As the beam is swept across the workpiece its horizontal velocity varies thereby producing a nonuniform exposure. The variation in the horizontal velocity of the beam is attributable to, among other things, the angular velocity of the mirror, the shape of the workpiece (typically planar) and the distance separating the mirror and the workpiece. In order to produce a uniform exposure the variation in the horizontal velocity of the beam is compensated for by modulating the power or intensity of the laser beam with a signal that is proportional to the horizontal velocity of the beam. Such a signal is produced by a phase comparator that is, in turn, part of a phase-locked loop that is used to compensate for positional errors that are attributable to, among other things, the aforementioned variation in the velocity of the beam. Based on the foregoing such an apparatus for producing a uniform exposure is sensitive to, among other things, the distance separating the mirror and the workpiece. Further, such an apparatus is not capable of varying the exposure. Additionally, such an apparatus is, typically, complicated, difficult to implement, and expensive.

In laser engravers that employ a galvanometer driven mirror in combination with either a diverging lens or a motor-driven multi-lens focus assembly maintaining a constant depth of cut is generally not a problem due to the responsiveness of such systems. More specifically, the relatively high acceleration and deceleration of the galvanometer driven mirror results in the laser beam being brought up to speed relatively quickly. Consequently, a constant depth of cut can be achieved in such an engraver by simply maintaining the power of the laser beam at a constant level during the cutting of a pattern in a workpiece. Such apparatuses are not, however, capable of varying the depth of cut. Further, the aforementioned drawbacks associated with laser engravers that employ a galvanometer driven mirror in conjunction with a diverging lens or motor-driven multi-lens focus assembly on the whole render such engravers undesirable for certain applications.

Based on the foregoing there exists a need for a laser engraver that can move the laser beam relative to the workpiece and control the depth of cut in a timely and efficient manner. Moreover, there exists a need for a laser engraver that is relatively insensitive to errors in the positioning of the laser beam or the workpiece, inexpensive to implement and reliable.

SUMMARY OF THE INVENTION

The laser engraver of the present invention includes a laser for providing a laser beam to use in engraving a workpiece. The laser engraver further includes an apparatus for providing pattern data that defines the pattern to be engraved on the workpiece. The pattern data, preferably, includes one or more data sets which specify the individual movements of the laser beam that are necessary to establish the pattern on the workpiece. Preferably, each data set defines an individual movement of the laser beam in terms of the relative displacements that are necessary to move the laser beam from a starting position to a target position in each of two dimensions. In the preferred embodiment, a data set includes a relative displacement along a X-axis and a relative displacement along a Y-axis. The preferred laser engraver further includes an X-Y assembly comprising a X-device and a Y-device for linearly displacing the laser beam along, respectively, the X-axis and the Y-axis according to the relative displacements specified in the data set. Linear displacement or movement of the laser beam using the x-y assembly avoids most, if not all, of the drawbacks associated with laser engravers that employ galvanometer driven mirrors that are rotated in order to position the laser beam. The X-device includes a proportional-integral-differential (PID) controller that generates a X-control signal based upon the current position of the laser beam along the X-axis and the target position for the laser beam along the X-axis. The current position of the laser beam along the X-axis is provided to the PID by an encoder that is operatively attached to a motor which drives a carriage along the X-axis. The control signal produced by the PID is applied to the motor which, in turn, drives the carriage linearly along the x-axis toward the target position. Operatively connected to the carriage is a mirror which directs the laser beam toward the workpiece. The Y-device includes substantially the same components and functions in substantially the same manner as the X-device. The PIDs produce control signals that are designed to operate within certain physical constraints imposed by the motor and carriage structures. Consequently, the speed with which the laser beam is moved relative to the workpiece varies. More specifically, at the onset of a movement between a starting position and a target position the PIDs operate such that the speed with which the laser beam is moved relative to the workpiece gradually increases until a defined maximum velocity is attained. Conversely, upon approaching the target position the PIDs operate to gradually reduce the speed with which the laser beam is moving relative to the workpiece.

The laser engraver further includes a cut control apparatus that controls the depth of cut made by the laser beam. The cut control apparatus operates to produce a constant depth of cut by modulating the power of the laser beam in accordance with the variation in speed with which the laser beam is being moved by the X-Y device and, in particular the PIDs. Consequently, when the speed of the laser beam increases the cut control apparatus increases the power of the laser beam and when the speed of the laser beam decreases the cut control apparatus decreases power of the laser beam. Specifically, the cut control apparatus modulates the power of the laser beam based upon the difference between the current position of the laser beam, as it is moved from the starting position to the target position, and a reference position. The reference position is, preferably, defined such that the difference between the current position of the laser beam and the reference position is zero when the current position corresponds to the reference position.

In a preferred embodiment of the cut control apparatus the integral of the difference between the current position of the laser beam and the reference position, relative to a major axis, is used to control the power of the laser beam. The major axis is the axis over which the greater displacement of the laser beam occurs during a movement between a starting position and target position. The reference position is, preferably, defined to be the mid-point between the starting and target positions along the major axis to produce a cut of constant depth. In this situation the integral of the difference gradually increases until the reference position is reached and then gradually decreases upon approaching the target position. The gradual increase and decrease in the integral correspond, at least in part, to the gradual increase and decrease in the speed of the laser beam as defined by the PIDs. Consequently, the integral is used to modulate the power of the laser beam substantially in accordance with the speed of the laser beam thereby producing a cut of constant depth.

In another embodiment of the cut control apparatus the absolute magnitude of the difference between the current position and the reference position, relative to a major axis, is used to control the power of the laser. In order to produce a constant depth of cut the reference position is defined to be the starting position until the laser beam passes the mid-point between the starting and target positions along the major axis. In this situation the absolute magnitude of the difference between the current position of the laser beam and the reference position gradually increases over time. After the laser beam passes the mid-point along the major axis the target position is established as the reference position. The absolute magnitude of the difference between the current position and the target position, in contrast, decreases over time. The gradual increase and decrease in the absolute magnitudes of the differences between current position and, respectively, the starting and target positions relative to the main axis correspond, at least in part, to the gradual increase and decrease in the speed of the laser beam as defined by the PIDs. Consequently, the absolute magnitude of these differences is used to modulate the power of the laser beam substantially in accordance with the speed of the laser beam thereby producing a cut of constant depth.

Preferably, the cut control apparatus is also capable of scaling the modulation signal provided to the laser beam such that cuts of different constant depths or dynamically varying cuts are produced.

BRIEF DESCRIPTION OF THE DRAWINGS

FIG. is a block diagram of the preferred embodiment of the invention.

DETAILED DESCRIPTION

Figure 1:
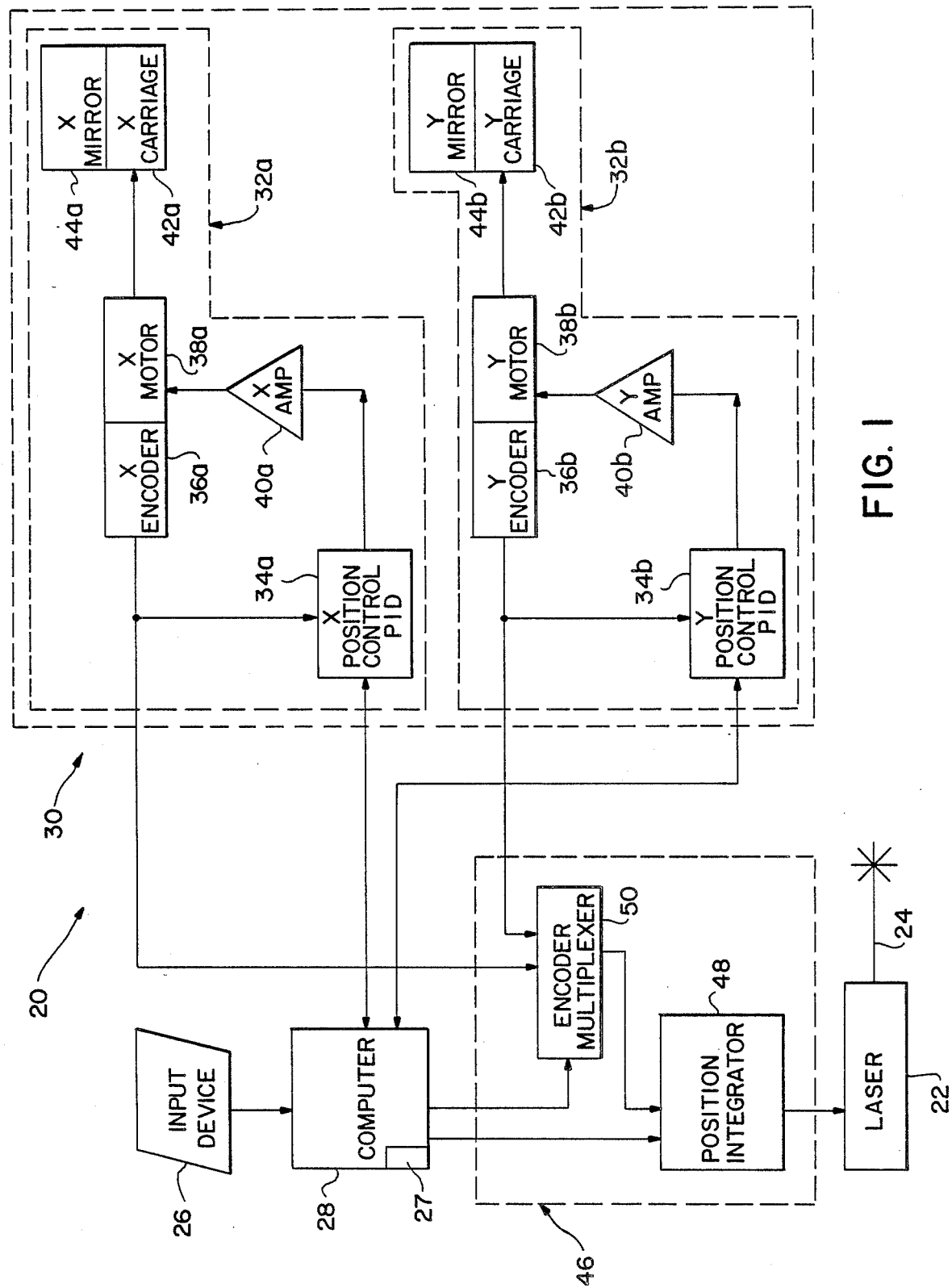
Figure 2:
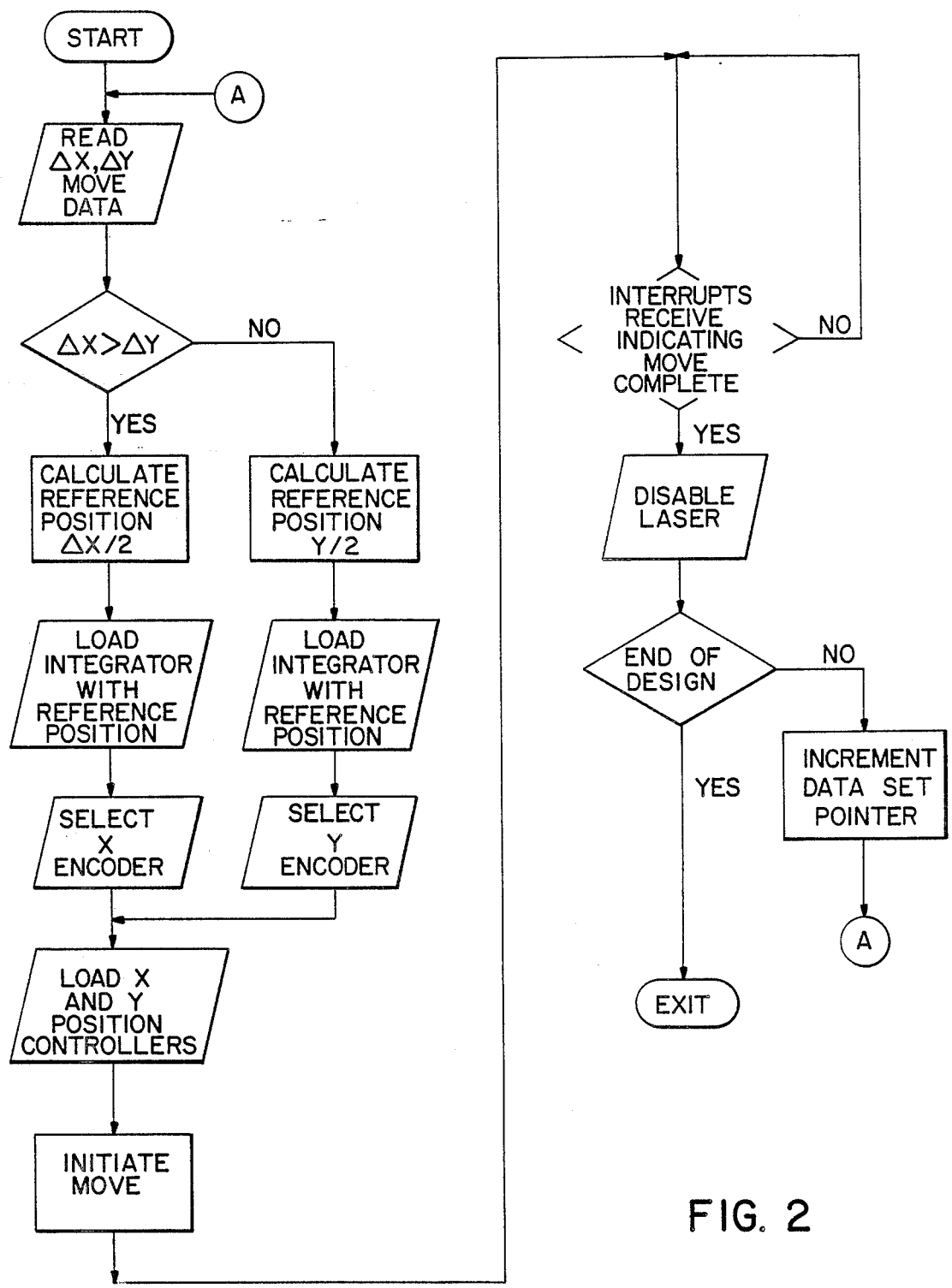
FIG. 2 is a flow chart of the preferred method for implementing the present invention.

With reference to FIG. 1, a laser engraver 20 is illustrated. The laser engraver 20 includes a laser 22 for providing a laser beam 24 that can be used to engrave a workpiece.

The laser engraver 20 further includes an input device 26 for providing pattern data to a computer. Preferably, the input device 26 is a disk drive that can, in addition to communicating the pattern data to the computer, also provide permanent storage for the data. The input device 26 could also be a keyboard, a joystick, a light pen, a tape drive, a local area network (LAN) device or any other device capable of providing the pattern data to the computer. The pattern data is comprised of one or more sets of two-dimensional coordinate information that specify the movement or movements of the laser beam 24 that are necessary to establish a pattern on the workpiece. Preferably, a set of two-dimensional coordinate information specifies the displacements along a X-axis and a Y-axis relative to a starting position. For example, suppose a pattern data file includes the following two sets of two-dimensional coordinate information: (2,2) and (2,−3). Movement of the laser beam 24 according to the first set of two-dimensional coordinate information would result in the laser beam 24 being moved from its present or starting position to a target position two units further along the X-axis and two units further along the Y-axis. Similarly, movement of the laser beam 24 according to the second set of two-dimensional coordinate information would move the laser beam 24 from the starting position established by the first set to a target position two units further along the X-axis and negative three units further along the Y-axis.

The laser engraver 20 further includes a computer 28 for controlling a X-Y device that moves the laser beam 24, according to the pattern data provided by the input device 26 and information provided by a user on a user interface 27, and a cut control device that controls the depth of the cut made by the laser beam 24 during the movements specified by the pattern data.

Also included in the laser engraver 20 is an X-Y device 30 for moving the laser beam 24 according to information provided by the computer 28. The X-Y device 30 includes a X-apparatus 32a for moving the laser beam 24 along the X-axis and a Y-apparatus 32b for simultaneously moving the laser beam 24 along the Y-axis.

The X-apparatus 32a includes a X-proportional-integral-differential controller 34a, hereinafter referred to as X-PID 34a, for generating a X-control signal based upon the current and target positions of the laser beam 24 along the X-axis. Specifically, the computer 28, upon processing a set of two-dimensional coordinate information, initiates the required linear displacement of the laser beam 24 along the X-axis by providing the X-PID 34a with a target position along the X-axis. For example, if the computer 28 is processing the aforementioned second set, i.e. (2,−3), then it would provide the X-PID 34a with the appropriate information for linearly displacing the laser beam 24 two units along the X-axis. The current position of the laser beam 24 along the X-axis during a movement from a starting position to a target position is provided to the X-PID 34a by a X-encoder 36a that is operatively connected to a X-motor 38a. Based upon the current and target positions of the laser beam 24 along the X-axis the X-PID 34a generates a X-control signal that is amplified by a X-amplifier 40a and then applied to the X-motor 38a. The X-motor 38a, in turn, causes a X-carriage 42a to linearly displace a X-mirror 44a toward the target position along the X-axis. The X-mirror 44a is positioned such that it receives the laser beam 24 produced by the laser 22 and directs it toward the workpiece.

The Y-apparatus 32b includes a Y-proportional-integral-differential integral-differential controller 34b, hereinafter referred to as X-PID 34b, for generating a Y-control signal based upon the current and target positions of the laser beam 24 along the Y-axis. Specifically, the computer 28, upon processing a set of two-dimensional coordinate information, initiates the required movement of the laser beam 24 along the Y-axis by providing the Y-PID 34b with a target position along the Y-axis. For example, if the computer 28 is processing the aforementioned second set, i.e. (2,−3), then it would provide the Y-PID 34b with the appropriate information for linearly displacing the laser beam 24 negative three units along the Y-axis. The current position of the laser beam 24 along the Y-axis during a movement from a starting position to a target position is provided to the Y-PID 34b by a Y-encoder 36b that is operatively connected to a Y-motor 38b. Based upon the current and target positions of the laser beam 24 along the Y-axis the Y-PID 34b generates a Y-control signal that is amplified by a Y-amplifier 40b and then applied to the Y-motor 38b. The Y-motor 38b, in turn, causes a Y-carriage 42b to linearly displace a Y-mirror 44b toward the target position along the Y-axis. The Y-mirror 44b is located such that it receives the laser beam 24 and directs it toward the workpiece.

The X-PID 34a and the Y-PID 34b generate control signals that are designed to work within certain physical constraints of the X-apparatus 32a and the Y-apparatus 32b such as the ability of the motors to start and stop the movement of the carriages. Consequently, when the laser beam 24 is moved from a starting position to a target position the X-PID 34a and the Y-PID 34b produce control signals that result in a gradual increase in the speed of the laser beam at the onset of the movement and a gradual decrease in the speed of the laser beam toward the end of the movement. For example, suppose the laser beam is located at a starting position defined by the aforementioned first set, i.e. (2,2), and the laser beam 24 is to be moved according to the second set, i.e. (2,−3). Initially, the X-PID 34a and the Y-PID 34b, based upon the target position as defined by the second set and the current position, initially the starting position, produce control signals that gradually increase the speed of the laser beam 24. The control signals produced by the X-PID 34a and Y-PID 34b continue to increase the speed of the laser beam until a defined maximum velocity is reached. As the current position of the laser beam 24 approaches the target position, as defined by the second set, the X-PID 34a and the Y-PID 34b generate control signals that gradually reduce the speed of the laser beam 24. Consequently, due to the operation of X-PID 34a and Y-PID 34b the velocity of the laser beam 24 varies for considerable distances over the workpiece thereby rendering such a laser engraver susceptible to variations in the depth of cut produced by the laser beam 24.

The X-PID 34a and the Y-PID 34b are programmed by the computer 28, based on information provided by the user, to produce X and Y control signals, respectively, that define the rate at which the speed of the laser beam 24 increases up to the defined maximum speed (acceleration) and the rate at which the speed of the laser beam 24 decreases (deceleration) from the defined maximum speed or lesser value.

The laser engraver 20 further includes a cut control device 46 for generating a laser control signal based upon the difference between the current position of the laser beam 24 and a reference position. The laser control signal determines the power in the laser beam produced by the laser 22 and, hence, the depth of cut established in a workpiece. The cut control device 46 preferably includes a position integrator 48 that integrates the difference between the current position of the laser beam 24 and a reference position with respect to a major axis for each movement of the laser beam 24 between a starting position and a target position as defined by a data set. The major axis is the axis over which the greater absolute displacement of the laser beam 24 occurs during a movement between a starting position and a target position. For example, the major axis of the aforementioned second set i.e. (2,−3), is the Y-axis. Preferably, the computer 28 determines the major axis of movement between the starting and the target positions by comparing the absolute values of the relative displacements along the X and Y axes as specified in a set of two-dimensional coordinate information. The computer 28 also defines a reference position relative to the major axis and communicates it to the position integrator 48. Furthermore, the computer 28 directs an encoder multiplexer 50 to provide the current position of the laser beam 24 relative to the major axis, as defined by either the X-encoder 36a or the Y-encoder 36b, to the position integrator 48. The integral of the difference between the current position of the laser beam 24 and the reference position is used to pulse width modulate a laser control signal accordingly. The pulse width modulated laser control signal, in turn, defines the power of the laser beam 24.

To produce a cut of constant depth relative to the major axis of movement the position integrator 48 must be provided with information that allows it to properly control the power of the laser beam 24 during the periods of time when the laser beam 24 is being accelerated, at the defined maximum speed, and being decelerated. Specifically, information must be provided to the position integrator 48 that defines the point in time at which the defined maximum speed of the laser beam 24 is attained. It is at this point in time that the laser control signal and, hence, the power of the laser beam, should also reach a maximum. If this were not so, then a cut of constant depth relative to the major axis of movement would not be produced. For instance, if the maximum power of the laser beam 24 is reached before the laser beam 24 reaches the defined maximum velocity, then the cut produced prior to reaching the defined maximum velocity will be deeper than the cut produced at the defined maximum velocity. Consequently, when the computer 28 defines the rate at which the laser beam 24 accelerates and decelerates to the PID associated with the major axis of movement, it also provides the position integrator 48 with information that defines the point in time at which the laser beam 24 reaches its maximum velocity relative to the major axis of movement. In addition, the computer 28 provides the position integrator 48 with a maximum laser power parameter. The laser power parameter can be either a user selected value or a default value. The position integrator 48 can then uses whatever power level has been defined together with the information concerning the point at which the laser beam reaches its maximum velocity to properly control the power of the laser beam during the periods of time when the laser beam 24 is accelerated, moving at a constant velocity and decelerating.

Preferably, the computer 28 also provides the position integrator 48 with a scaling function, defined by the user, that is used to modulate the laser control signal input to the laser 22. Scaling of the laser control signal produced by the position integrator 48 is typically used to compensate for a deviation in acceleration from that defined relative to the major axis when the laser beam is moved along both the X and Y axis. Scaling is also used to produce cuts of varying constant depths. For instance, constant scaling funtions could be used to produce a first cut having a depth of two millimeters and a second cut having a depth of four millimeters. Further, scaling is also used to dynamically vary the depth of cut or cut profile. For example, scaling functions, like sine-waves and triangle waves, can be used to dynamically vary the depth of cut.

With reference to FIGS. 2, 3A-3D and 4A-4D, the operation of the laser engraver 20 in producing a cut having a constant depth is now described. Initially, the computer 28 reads the required relative displacements of the laser beam 24 as specified in a set of two-dimensional coordinate information provided by the input device 26. The computer 28 compares the relative displacement required along the X-axis to the relative displacement required along &he Y-axis to determine the major axis. If the relative displacement along the X-axis is greater than the relative displacement along the Y-axis then the X-axis is defined to be the major axis. The computer 28, following the determination of the X-axis as the major axis, proceeds to determine a reference position with respect to the X-axis. Since a constant depth of cut is desired the computer 28 defines the reference position as the midpoint of the required movement along the X-axis. For example, if the laser beam is to be moved along the X-axis from a starting position having an absolute X-coordinate of (1) to an ending position having an absolute X-coordinate of (5) then the mid-point would be (3). Following the determination of the reference position the computer 28 communicates the reference position to the position integrator 48. The computer 28 then programs the encoder multiplexer 50 such that a communication path is established whereby the X-encoder 36a can communicate the current position of the laser beam 24 along the X-axis to the position integrator 48 during a movement of the laser beam 24 between a starting and target position.

If, on the other hand, the relative displacement along the Y-axis is greater than the relative displacement along the X-axis then the Y-axis is defined to be the major axis. The computer 28 in this instance determines and communicates a reference position to the position integrator 48 substantially in accordance with the procedure described hereinabove with respect to the X-axis. The computer 28 then programs the encoder multiplexer 50 such that a communication path is established whereby the Y-encoder 36b can communicate the current position of the laser beam 24 along the Y-axis to the position integrator during a movement of the laser beam 24 between a starting and target position is established.

If necessary, the computer 28 also provides the position integrator 48 with information regarding the maximum laser power, and the point in time at which the laser beam 24 attains its maximum speed. Moreover, if the laser beam 24 is to be moved in both the X and Y dimensions, the computer 28 provides the position integrator 48 with the appropriate scaling function to compensate for the previously mentioned deviation in acceleration.

Once the computer 28 has accomplished the foregoing functions, it then loads the X-PID 34a and the Y-PID 34b with the target positions along the X and Y axes, respectively, and initiates the linear movements. The computer 28 then waits for interrupts from the X-PID 34a and the Y-PID 34b which indicate that the required movement along, respectively, the X and Y axes is complete. Once the movement is complete along both the X and Y axes the computer 28 disables the laser 22 by resetting the output of the position integrator 48 to zero. The computer then determines whether the pattern is complete. If the pattern is not complete then the computer 28 proceeds to process the next data set in the pattern data.

FIGS. 3A-3D graphically illustrate the relationship between the movement of the laser beam 24 along the major axis from a starting position to a target position and the derivation of a laser control signal. Furthermore, FIGS. 3A-3D illustrate the situation where the distance between the starting and target positions is sufficiently great enough for the the laser beam 24 beam to be brought up to a defined maximum speed as a result of the operation of X-PID 34a and Y-PID 34b. The aforementioned relationships will be discussed with respect to the time intervals $T_0$ to $T_1$, $T_1$ to $T_2$, and $T_2$ to $T_3$.

Figure 3A:
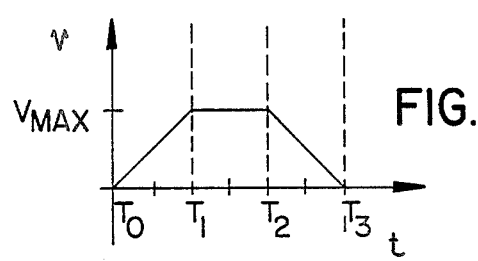
FIG. 3A is a graph of the velocity of the speed of the laser beam with respect to time.
Figure 4A:
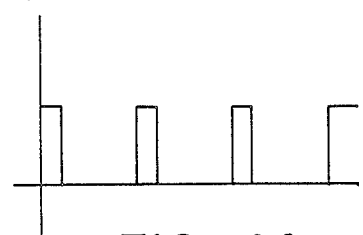
FIGS. 4A–4D illustrate the pulse width modulated control signal output by the position integrator to control the power or intensity of the laser beam at various points in time.
Figure 3B:
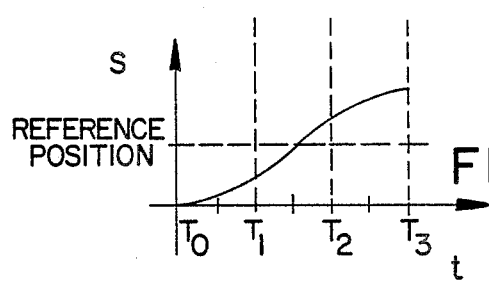
FIG. 3B is a graph of the position of laser beam relative to a set position and with respect to time.
Figure 4B:
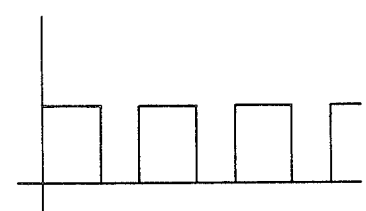
Figure 3C:
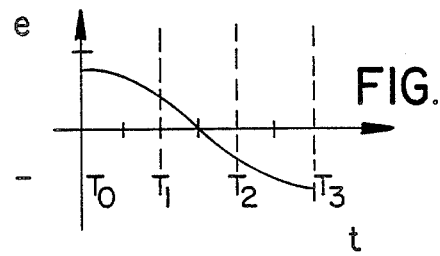
FIG. 3C is a graph of the error or difference between the position of the laser beam and the set position with respect to time.
Figure 3D:
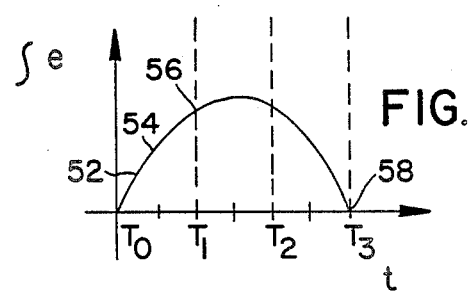
FIG. 3D is a graph of the integral of the error or difference between the position of one of the carriages and the set position with respect to time.
Figure 4D:
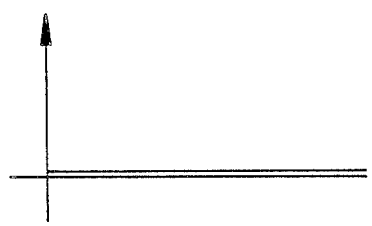

With respect to the period of time extending from $T_0$ to $T_1$ the velocity of the laser beam 24, as illustrated in FIG. 3A, gradually increases due to the operation of the PID associated with the major axis. Concomitantly, the laser beam 24 begins to move away from the starting position and toward the target position on the major axis as shown in FIG. 3B. As illustrated in FIG. 3C the error or difference between the current position of the laser beam 24 and the reference position, shown in FIG. 3B as the mid-point of the movement along the major axis, is initially relatively large and then decreases as the current position of the laser beam 24 approaches the reference position. The integral of the error of difference during the $T_0$ to $T_1$ time frame, as produced by the position integrator 48, gradually increases as illustrated in FIG. 3D. The magnitude of the integral of the error is, in turn, used to pulse width modulate a laser control signal that defines the power of the laser beam 24. Consequently, during the interval extending from $T_0$ to $T_1$ the position integrator 48 increases the power of the laser as the speed of the laser beam 24 increases thereby producing a cut of constant depth.

With respect to the interval of time extending from from $T_1$ to $T_2$ the laser beam 24 is moving at a substantially constant, maximum velocity as illustrated in FIG. 3A. Since the laser beam 24 is moving at a constant velocity a cut of constant depth is produced by maintaining the laser control signal and, hence, the power of the laser beam 24 at the level established by the integral when the laser beam 24 attained its maximum velocity, i.e. time $T_1$. Furthermore, the current position of the laser beam 24 approaches and then passes through the reference position, i.e. &he point at which the error or difference is zero, as illustrated in FIGS. 3B and 3C. The integral of the difference between the current position of the laser beam 24 and the reference position increases while the laser beam 24 is approaching the reference position and then begins to decrease as the laser beam 24 passes the reference position as shown in FIG. 3D.

With respect to the period of time extending from $T_2$ to $T_3$ the velocity of the laser beam 24 gradually decreases, as illustrated in FIG. 3A, due to the operation of the PID associated with the major axis. As illustrated in FIG. 3B, the laser beam 24 continues to approach the target position on the major axis. The error or difference between the the current position of the laser beam 24 and the reference position during this interval increases (negatively) as the current position of the laser beam 24 approaches the target position. As a consequence thereof the integral of the error or difference between the current position of the laser beam 24 and the reference position, as produced by the position integrator 48, gradually decreases. Consequently, during the interval extending from $T_2$ to $T_3$ the position integrator 48 decreases the power of the laser beam 24 as the speed of the laser beam 24 decreases thereby producing a cut of constant depth.

Figure 4C:
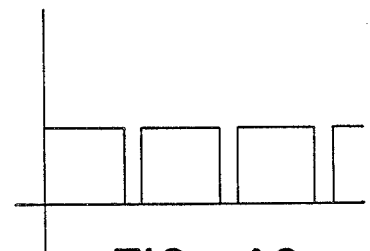

FIGS. 4A-4D illustrate the pulse width modulated laser control signal at, respectively, points 52, 54, 56 and 58 of the integral signal illustrated in FIG. 3D. With reference to FIG. 4C, the pulse width modulated laser control signal is at its maximum level. As previously discussed the laser control signal is maintained at the maximum level throughout the period when the laser beam is being moved at a constant velocity, i.e., $T_1$ to $T_2$.

Figure 5:
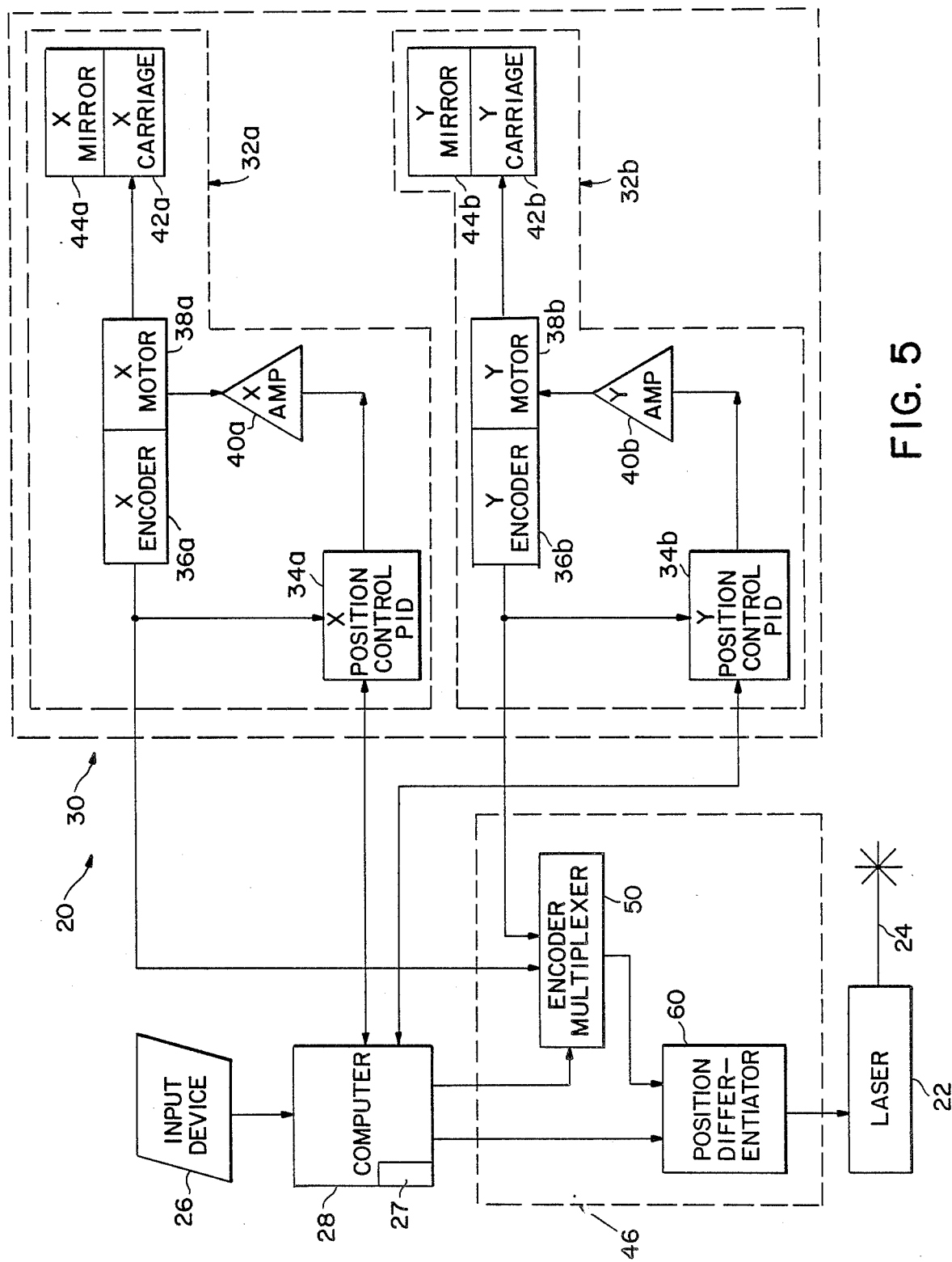
FIG. 5 is a block diagram of an alternative embodiment of the invention that utilizes proportional control to control the depth of cut.

With reference to FIG. 5 an alternative embodiment of the laser engraver 20 is illustrated. The alternative embodiment of the laser engraver 20 implements proportional control of the depth of cut. Proportional control is based upon absolute difference between the current position of the laser beam 24 with resect to the major axis and a reference position. A position differentiator 60 is used to implement proportional control in the alternative embodiment of the laser engraver 20. The remaining components in alternative embodiment of the laser engraver 20 correspond to, and hence are given the same reference numbers, the components shown in FIG. 1. Further, the computer 28 provides the X-PID 34a and Y-PID 34b with information that defines the rate at which the speed of the laser beam 24 increases up to a defined maximum and the rate of deceleration. Concomitantly, the computer 28 provides the position differentiator 60 with information for controlling the power of the laser beam 24 such that maximum power is attained at the point in time when the laser beam 24 reaches its maximum velocity. Moreover, the computer 28 provides the position differentiator 60 with a definition of the maximum power of the laser beam 24 or selects a default value. The position differentiator 60 processes the information provided by the computer in substantially the same fashion as the position integrator 48. The computer 28 also provides the position differentiator 60 with a scaling function, if necessary.

Figure 6:
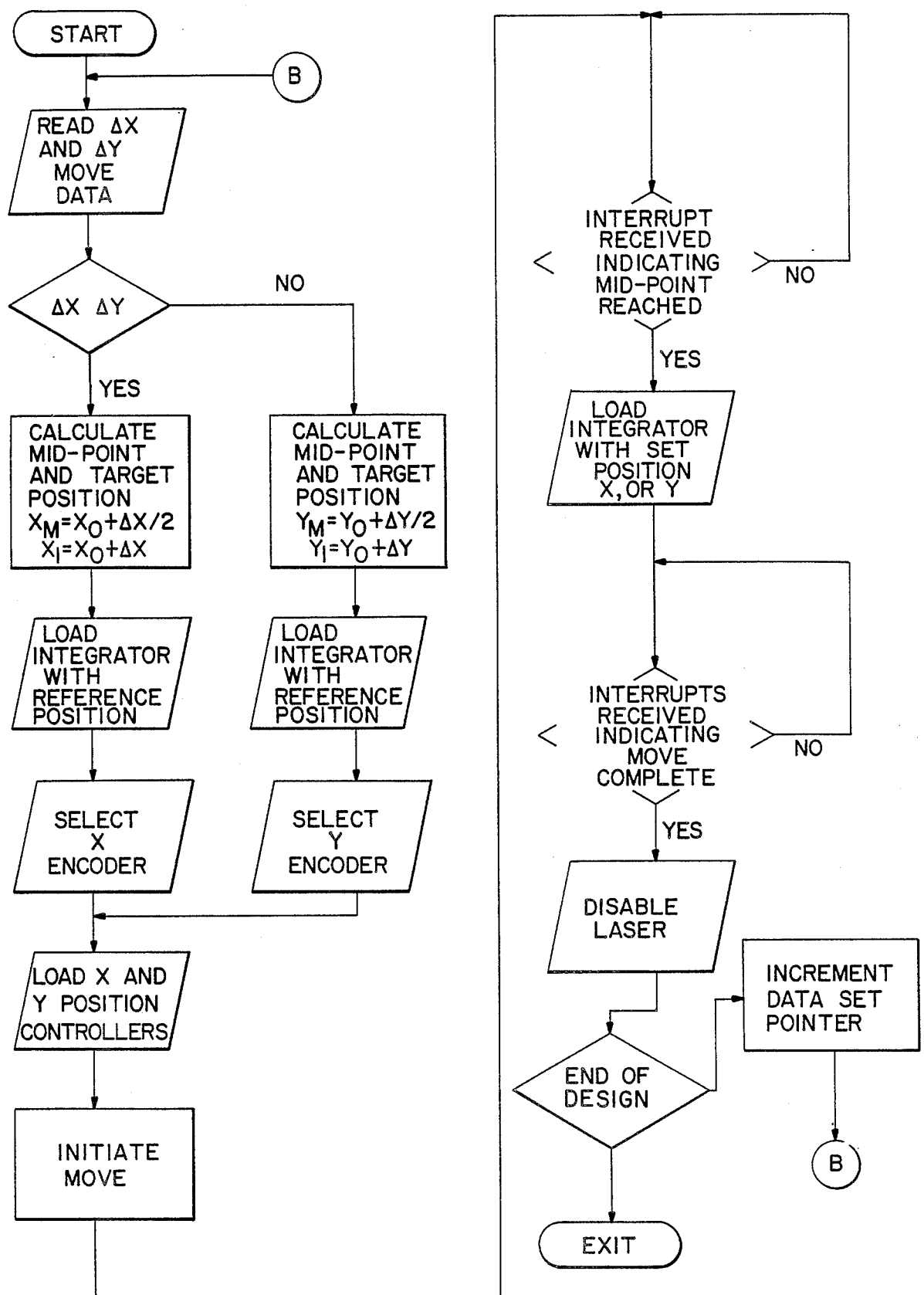
FIG. 6 is a flow chart of the method for implementing the alternative embodiment of the invention.

With reference to FIG. 6, the operation of the alternative embodiment of the laser engraver 20 in producing a pattern with a constant depth of cut is now described. Initially, the computer 28 reads the required relative displacements of the laser beam 24 as specified in a set of two-dimensional coordinate information provided by the input device 26. The computer 28 compares the relative displacement required along the X-axis to the relative displacement required along the Y-axis to determine the major axis. If the relative displacement along the X-axis is greater than the relative displacement along the Y-axis then the X-axis is the major axis. The computer 28, following the determination of the X-axis as the major axis, proceeds to determine the starting position, the mid-point position and the target position with respect to the X-axis. Using the starting position as the reference position until the mid-point is reached and the target position thereafter results in a laser control signal that produces a constant depth of cut. Initially, the computer 28 establishes the reference position to be the starting position with respect to the major axis. The computer 28 then programs the encoder multiplexer 50 such that a communication path is established whereby the X-encoder 36a can communicate the current position of the laser beam 24 along the X-axis to the position differentiator 60 during a movement of the laser beam 24 between a starting and target position.

If necessary, the computer 28 also provides the position integrator 48 with information concerning the maximum laser power and the point in time at which the laser beam 24 attains its maximum speed. In addition, the computer 28 provides the position differentiator 60 with the appropriate scaling function if the laser beam 24 is to be moved along both the X and Y axes.

If, on the other hand, the relative displacement along the Y-axis is greater than the relative displacement along the X-axis then the Y-axis is the major axis. The computer 28 in this instance determines the starting position, mid-point position and target position with respect to the Y-axis. Initially, the computer 28 establishes starting position with respect to the major axis as the reference position. The computer 28 then programs the encoder multiplexer 50 such that a communication path is established whereby the Y-encoder 36b can communicate the current position of the laser beam 24 along the Y-axis &o the position differentiator 60 during a movement of the laser beam 24 between a starting and target position.

Once the computer 28 has communicated the reference position, i.e. the starting position, to the position integrator 48 and established a communication path between appropriate encoder and the position differentiator 60 the computer 28 then loads the X-PID 34a and the Y-PID 34b with the target positions along the X and Y axes, respectively, and initiates the linear movements. The computer 28 then waits for an interrupt from the position differentiator 60 which indicates that the midpoint along the major axis has been reached. If the laser beam 24 has reached or passed through the midpoint of the movement along the major axis then the computer 28 establishes the target position with respect to the major axis as the reference point. The computer 28 then waits for interrupts from the X-PID 34a and the Y-PID 34b which indicate that the required movement along, respectively, the X and Y axes is complete. Once the movement is complete the computer 28 disables the laser 22 by resetting the output of the position integrator 48 to zero. The computer then determines whether the pattern is complete. If the pattern is not complete then the computer 28 proceeds to process the next data set.

Figure 7A:
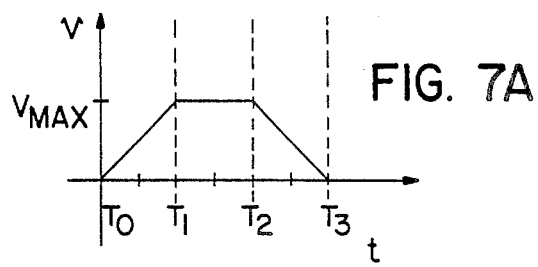
FIG. 7A is a graph of the velocity of the laser beam with respect to time for the alternative embodiment of the invention.
Figure 7B:
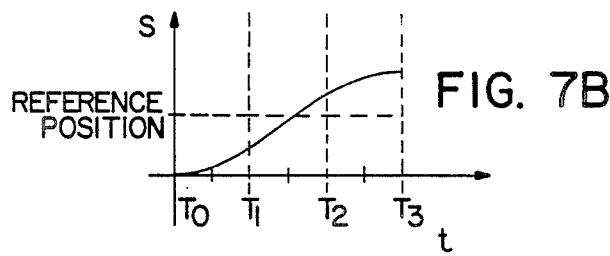
FIG. 7B is a graph of the position of the laser beam relative to a set position and with respect to time for the alternative embodiment of the invention.
Figure 7C:
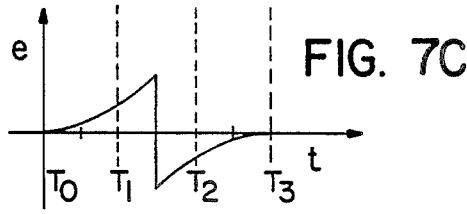
FIG. 7C is a graph of the error or difference between the position of the laser beam and the set position over time for the alternative embodiment of the invention.

FIGS. 7A–7C graphically illustrates the relationship between the movement of &:he laser beam 24 along the major axis from a starting position to a target position and the derivation of a laser control signal. Furthermore, FIGS. 7A–7C illustrate the situation where the distance between the starting and target positions is sufficiently great enough for the the laser beam 24 beam to be brought up to a defined maximum speed as a result of the operation of the X-PID 34a and Y-PID 34B. The aforementioned relationships will be discussed with respect to the time intervals $T_0$ to $T_1$, $T_1$ to $T_2$, $T_2$ to $T_3$.

With respect to the period of time extending from $T_0$ to $T_1$ the velocity of the laser beam 24, as illustrated in FIG. 7A, gradually increases due to the operation of the PID associated with the major axis. Concomitantly, the laser beam 24 begins to move away from the starting position and toward the target position on the major axis as shown in FIG. 7B. The error or difference between the the current position of the laser beam 24 and the reference position, which is the starting position at this time, gradually increases as the laser beam moves away from the starting position as illustrated in FIG. 7C. The absolute magnitude of the error is used to pulse width modulate a laser control signal that, in turn, defines the power of the laser beam 24. Consequently, during the interval extending from $T_0$ to $T_1$ the position differentiator 60 increases the power of the laser as the speed of the laser beam 24 increases thereby producing a cut of constant depth.

With respect to the interval from $T_1$ to $T_2$ the laser beam 24 is moving at a substantially constant velocity as illustrated in FIG. 7A. Since the laser beam 24 is moving at a constant velocity a cut of constant depth is produced by maintaining the laser control signal and, hence, the power of the laser beam 24 at the level established by the integral when the laser beam 24 attained its maximum velocity, i.e. time $T_1$. Furthermore, as the laser beam 24 approaches the mid-point of the movement along the major axis the error or difference between the current position and the reference position, i.e. the starting position, continues to increase as shown in FIGS. 7A and 7B. Once the current position of the laser beam 24 corresponds to the mid-point the computer 28 establishes the target position as the reference position. With the target position as the reference position the error, as illustrated in FIG. 7C, becomes relatively large and proceeds to decrease as the laser beam 24 proceeds toward the target position.

With respect to the period of time extending from $T_2$ to $T_3$ the velocity of the laser beam 24 gradually decreases due to the operation of the PID associated with the major axis and the laser beam 24 continues to approach the target position on the major axis as illustrated in FIGS. 7A and 7B. The error or difference between the the current position of the laser beam 24 and the reference position, i.e. the target position, decreases as the current position of the laser beam 24 approaches the target position. Consequently, during the interval extending from $T_2$ to $T_3$ the position differentiator 60 decreases the power of the laser beam 24 as the speed of the laser beam 24 decreases thereby producing a cut of constant depth.

Figure 8A:
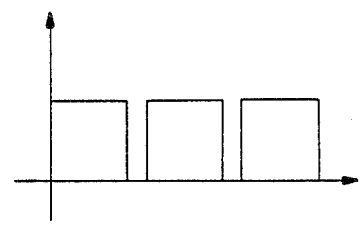
FIG. 8A illustrates a pulse width modulated laser control signal for a laser beam moving at a constant velocity and producing a cut of constant depth.
Figure 8B:
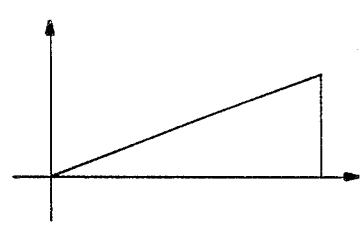
FIG. 8B illustrates a triangularly shaped scaling function for producing a cut having a triangular profile.
Figure 8C:
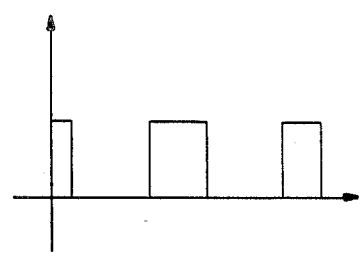
FIG. 8C illustrates the pulse width modulated laser control signal produced by a cut control device to achieve a cut with the triangular profile.
Figure 8D:
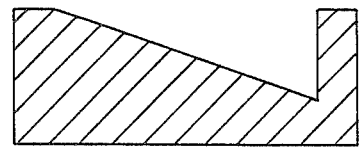
FIG. 8D shows a workpiece having a triangular cut profile that corresponds to the triangularly shaped scaling function.

FIGS. 8A–D illustrate the modulation of the laser control signal by a scaling function to produce a cut profile that starts out shallow and becomes progressively deeper. Specifically, FIG. 8A illustrates the pulse width modulated laser control signal produced by either the position integrator 48 or position differentiator 60 when the laser bean 24 is being moved at the defined maximum velocity and a constant depth of cut is desired. FIG. 8B illustrates the triangularly shaped scaling function that defines the desired cut profile. With reference to FIG. 8C, the position integrator 48 or position differentiator 60 outputs a pulse width modulated laser control signal where the width of the pulses vary in accordance with the triangularly shaped scaling function. In response to the pulse width modulated laser control signal, and with reference to FIG. 8D, the laser 22 controls the power of the laser beam 24 such that a cut is produced in a workpiece that is initially shallow and becomes progressively deeper in accordance with the defined scaling function.

The foregoing description of the invention has been presented for purposes of illustration and description. Further, the description is not intended to limit the invention to the form disclosed therein. Consequently, variations and modifications commensurate with the above teachings, and skill or knowledge in the relevant art are within the scope of the present invention. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be cons&.rued to include alternative embodiments to the extent permitted by the prior art.

What is claimed is:

1. An apparatus for engraving a workpiece using a radiation beam, comprising:
   means for providing a radiation beam to use in engraving the workpiece;
   means for producing a target position for the radiation beam;
   means for producing a current position of the radiation beam;
   means, responsive to said target position and said current position of said radiation beam, for generating a control signal; and
   means, responsive to said control signal, for moving said radiation beam from said current position to said target position wherein said means for producing a current position includes encoder means operatively connected to said means for moving.

2. An apparatus, as claimed in claim 1, wherein:

said means for generating a control signal includes a proportional-integral-differential control means.

3. An apparatus, as claimed in claim 1, further including:
means for controlling the power of said radiation beam to control the amount of material removed from the workpiece.

4. An apparatus, as claimed in claim 3, wherein:
said means for controlling includes means for determining a reference position.

5. An apparatus, as claimed in claim 4, wherein:
said means for controlling includes means for determining the difference between said current position and said reference position, wherein said difference is a defined value when said current position of said radiation beam is at a predetermined location relative to said reference position.

6. A method for engraving a workpiece using a radiation beam, comprising:
positioning the workpiece to be engraved in a suitable location relative to the radiation beam;
producing a target position for the radiation beam;
using encoder means, to determine the current position of the radiation beam;
generating a control signal using said target position and said current position; and
moving said radiation beam using said control signal.

7. A method, as claimed in claim 6, further including:
controlling the power of said radiation beam to control the amount of material removed from the workpiece.

8. A method, as claimed in claim 7, wherein:
said step of controlling the power of said radiation beam includes determining a reference position.

9. A method, as claimed in claim 8, wherein:
said step of controlling the power of said radiation beam includes determining the difference between said current position of said radiation beam and said reference position, wherein said difference is a defined value when said current position of said radiation beam is at a predetermined location relative to said reference position.

10. A method for engraving a workpiece using a radiation beam, comprising:
positioning the workpiece to be engraved in a suitable location relative to the radiation beam;
inputting information corresponding to a pattern to be engraved on the workpiece;
engraving the workpiece by movement of the radiation beam relative to the workpiece in first and second directions at the same time;
monitoring outputs of encoders associated with motors used in causing the relative movement; and
determining subsequent magnitudes of relative movement using outputs of said encoders.

11. An apparatus for engraving a workpiece using a radiation beam, comprising:
means for providing a radiation beam to use in engraving the workpiece;
first means for linearly moving said radiation beam relative to the workpiece in a first direction, said first means including a first mirror for use in directing said radiation beam in said first direction;
second means for linearly moving said radiation beam relative to the workpiece in a second direction different from said first direction, said second means having a second mirror used in directing said radiation beam in said second direction, wherein said first means and said second means can operate at the same time; and
means for controlling the power of said radiation beam to control the amount of material removed from the workpiece, said means for controlling including means for determining a reference position and means for determining the difference between a current position and said reference position, wherein said difference is a defined value when said current position of said radiation beam is at a defined location relative to said reference position.

12. An apparatus for engraving a workpiece using a radiation beam, comprising:
means for providing a radiation beam to engrave the workpiece along a path having a starting position and a target position;
means for moving said radiation beam from said starting position to said target position;
means for determining a reference position;
means for sensing the current position of said radiation beam along said path; and
means for controlling the amount of material removed by said radiation beam when moving along said path by controlling the power of said radiation beam, said means for controlling using the difference between said current position and said reference position, wherein the difference is a defined value when the current position of said radiation beam is at a defined location relative to said reference position.

13. An apparatus, as claimed in claim 12, wherein said radiation beam means includes a laser.

14. An apparatus, as claimed in claim 12, wherein said reference position includes a position along said path.

15. An apparatus, as claimed in claim 12, wherein said reference position includes the mid-point of said path.

16. An apparatus, as claimed in claim 12, wherein:
said reference position includes said starting position of said path for a firs& portion of the movement of said radiation beam along said path and said target position during a second portion of the movement of said radiation beam along said path.

17. An apparatus, as claimed in claim 12, wherein:
said means for sensing the current position of said radiation beam includes encoder means.

18. An apparatus, as claimed in claim 12, wherein:
said means for controlling the power of said radiation beam includes an integrator for summing differences between said current position of said radiation beam and said reference position during movement of said radiation beam from said starting position to said target position.

19. An apparatus, as claimed in claim 12, wherein:
said means for controlling the power of said radiation beam includes proportional means for using the absolute difference between the current& position of said radiation beam and said reference position during movement of said radiation beam from said starting position to said target position.

20. An apparatus, as claimed in claim 12, wherein:
said means for controlling the power of said radiation beam is responsive to a scaling function.

21. A method for engraving a workpiece using a radiation beam, comprising:
providing a radiation beam means for generating a radiation beam to engrave the workpiece;

determining a path on the workpiece for engraving by said radiation beam, said path laving a starting position and a target position;

determining a reference position;

directing said radiation beam along said path from said starting point to said target position;

determining the current position of said radiation beam during said step of directing; and controlling the amount of material removed by said radiation beam during said step of directing by controlling the power of said radiation beam, said step of controlling using the difference between the current position of said beam along said path and said reference position, wherein the difference is a defined value when the current position of the radiation beam is at a defined location relative to the reference position.

22. A method, as claimed in claim 21, wherein:
said step of determining said reference position includes determining said reference position to include a point along said path.

23. A method, as claimed in claim 21, wherein:
said step of determining said reference position includes defining said reference position to include the mid-point of said path.

24. A method, as claimed in claim 21, wherein:
said step of determining said reference position includes determining said reference position to include said starting position of said path for a first portion of the movement of said radiation beam along said path and said target position during a second portion of the movement of said radiation beam along said path.

25. A method, as claimed in claim 21, wherein:
said step of controlling the power of said radiation beam includes summing differences between said current position of said radiation and said reference position during movement of said radiation beam from said starting position to said target position.

26. A method, as claimed in claim 21 wherein:
said step of controlling the power of said radiation beam includes using the difference between the current position of said radiation beam and said reference position during movement cf said radiation beam from said starting position to said target position.

27. A method, as claimed in claim 21, wherein:
said step of controlling the power of said radiation beam includes using a scaling function.

28. An apparatus for engraving a workpiece using a radiation beam, comprising:

means for determining a path to engrave on the workpiece, said path having a starting position and a target position, said starting position being defined by a starting first coordinate information and a starting second coordinate information, said target position being determined by a target first coordination information and a target second coordinate information;

means for providing a radiator beam to use in engraving the workpiece along said path;

means for determining a current position of said radiation beam, said current position being defined by a current first coordinate information and a current second coordinate information;

means for moving said radiation team along a first axis using said current and target first coordinate information, and along a second axis using said current and target second coordinate information;

means for selecting a reference position relative to a major axis, wherein said major axis is the greater of the following: the absolute difference between said starting first coordinate information and said target first coordinate information, and the absolute difference between said starting second coordinate information and said target second coordinate information; and means for controlling the amount of material removed by said radiation beam when moving along said path by controlling the power of said radiation beam, said means for controlling using the difference between said current position and said reference position relative to said major axis, wherein the difference is a defined value when the current position of said radiation beam is at a defined location relative to said reference position.

29. An apparatus, as claimed in claim 28, wherein:
said reference position includes the mid-point of said path relative to said major axis.

30. An apparatus, as claimed in claim 28, wherein:
said reference position includes said starting position of said path relative to said major axis for a first portion of the movement between said starting and target positions, and said target position of said path relative to said major axis for a second portion of the movement between said starting and target positions.

31. An apparatus, as claimed in claim 28, wherein:
said means for controlling the power of said radiation beam includes an integrator for summing differences between said current position of said radiation beam and said reference position relative to said major axis during movement of said radiation beam from said starting position to said target position.

32. An apparatus, as claimed in claim 28, wherein:
said means for controlling the power of said radiation beam includes proportional means for using the absolute difference between the current position of said radiation beam and said reference position relative to said major axis during movement of said radiation beam from said starting position to said target position.

33. An apparatus for engraving a workpiece using a radiation beam, comprising:
means for providing a radiation beam to engrave the workpiece along a path having a starting position and a target position;
means for determining a scaling function;
means for moving said radiation team from said starting position to said target position; and
means for controlling the amount of material removed by said radiation beam when moving along said path by controlling the power of said radiation beam, said means for controlling using said scaling function.

34. A method for engraving a workpiece using a radiation beam, comprising:
providing a radiation beam means for generating a radiation beam to engrave the workpiece;
determining a path on the workpiece for engraving by said radiation beam, said path having a starting position and a target position;
determining a scaling function;

directing said radiation beam along said path from said starting point to said target position; and controlling the amount of material removed by said radiation beam during said step of directing by controlling the power of said radiation beam, said step of controlling using said scaling function.

35. An apparatus for engraving a workpiece using a laser beam, comprising:

means for determining a path to engrave on the workpiece, said path having a starting position and an target position, said starting position being defined by a starting X-coordinate and a starting Y-coordinate, said target position being defined by an target X-coordinate and an target Y-coordinate;

a laser for providing a laser beam to use in engraving the workpiece along said path;

means for moving said laser beam along a X-axis from said starting X-coordinate to said target X-coordinate, comprising:
  X-encoder means for determining the current X-position;
  X-proportional-integral-differential means, responsive to said current X-position and said target X-coordinate, for generating a X-control signal;
  X-motor means, responsive to said X-control signal, for moving a carriage having operatively connected thereto a X-mirror means for use in directing said laser beam to the workpiece;

means for moving said laser beam along a Y-axis from said starting Y-coordinate to said target Y-coordinate, comprising:
  Y-encoder means for determining the current Y-position;
  Y-proportional-integral-differential means, responsive to said current Y-position and said target Y coordinate, for generating a Y-control signal;
  Y-motor means, responsive to said Y-control signal for moving a carriage having operatively connected thereto a Y-mirror means for directing said laser beam to the workpiece;

means for defining a reference position that includes the mid-point of said path relative to a major axis, said major axis being determined by the greater of the absolute differences between said starting and target X-coordinates, and said starting and target Y-coordinates;

means for selecting the current position of said laser beam along said major axis from at least one of the following: said X-encoder means and said Y-encoder means;

means for controlling the amount of material removed from the workpiece by controlling the power of the laser beam, said means for controlling using a difference between said reference position and said current position relative to said major axis during the movement of said laser beam along said path, wherein said difference is a defined value when the current position of said laser beam laser corresponds to said reference position.

* * * * *